US006456588B1

(12) United States Patent
Simmons

(10) Patent No.: US 6,456,588 B1
(45) Date of Patent: Sep. 24, 2002

(54) HYPERCUBE ROUTING AND RESTORATION IN TELECOMMUNICATIONS NETWORKS

(75) Inventor: Jane Marie Simmons, Eatontown, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 10/003,245

(22) Filed: Dec. 6, 2001

Related U.S. Application Data

(63) Continuation of application No. 08/837,683, filed on Apr. 21, 1997.

(51) Int. Cl.[7] .............................................. H04L 12/26

(52) U.S. Cl. ....................................... 370/216; 370/351

(58) Field of Search ................................ 370/216–217, 370/222–225, 227–228, 234–235, 258, 355, 406–408, 423–425, 230.1, 351

(56) References Cited

U.S. PATENT DOCUMENTS

| | | | | |
|---|---|---|---|---|
| 5,170,482 A | * | 12/1992 | Shu et al. .................... | 395/800 |
| 5,280,607 A | * | 1/1994 | Bruck et al. .................... | 714/4 |
| 5,471,580 A | * | 11/1995 | Fujiwara et al. ....... | 395/200.02 |
| 5,701,416 A | * | 12/1997 | Thorson et al. ......... | 395/200.15 |
| 5,850,505 A | * | 12/1998 | Grover et al. ......... | 395/182.02 |
| 5,949,755 A | * | 9/1999 | Uphadya et al. ............ | 370/224 |

OTHER PUBLICATIONS

"Synchronous Optical Network (SONET)–Automatic Protection Switching," American National Standards Institute (1996).

Derek C.W. Pao and Chi–Kueng Chan, "Fault–Tolerant Message Routing in Hypercube Using Local Neigborhood Information," Proceedings of 1994 IEEE Region 10's Ninth Annual International Conference, vol. 1, pp. 440–444, Aug. 1994.

Francis Reichmeyer et al., "An Optical Hypercube Local Area Network," Proceedings of the Twenty–Seventh Hawaii International Conference on System Sciences, vol. 1, pp. 471–480, Jan. 1994.

Kenneth A. Williams and David H.C. Du, "Efficient Embedding of a Hypercube in an Irregular WDM Network, " Proceedings 18th Conference on Local Computer Networks, pp. 274–283, Sep. 1993.

Shahram Latifi and Suresh Rai, "A Robustness Measure for Hypercube Networks," Proceedings of the 36th Midwest Symposium on Circuits and Systems, pp. 546–549, Aug. 1993.

Tsong–Ho Wu *Fiber Network Service Survivability*, pp. 123–187 and 207–210 (Artech House, Inc. 1992).

Tsong–Ho Wu and Richard C. Lau, "A Class of Self–Healing Ring Architectures for SONET Network Applications," IEEE Globecon '90, Global Communications Conference, San Diego, California, pp. 403.2.1–403.2.8, Dec. 1990.

W. D. Grover "The SELFHEALING™Network," IEEE Globecom '87, Global Communications Conference, Tokyo, Japan, pp. 28.2.1–28.2.6, Nov. 1987.

* cited by examiner

*Primary Examiner*—Joe H. Cheng
*Assistant Examiner*—Kim T. Nguyen
(74) *Attorney, Agent, or Firm*—Kenyon & Kenyon

(57) ABSTRACT

A network architecture for configuring nodes and links into a plurality of interconnected hypercubes is presented. Each hypercube is interconnected with at least one other hypercube and operates substantially independently of the other hypercubes in the network. Each hypercube provides high levels of traffic routing diversity and restorative capability with less link capacity. Unique node labeling reduces internodal communication, and traffic routing and recovery is accomplished with less complex algorithms.

16 Claims, 11 Drawing Sheets

PRIOR ART

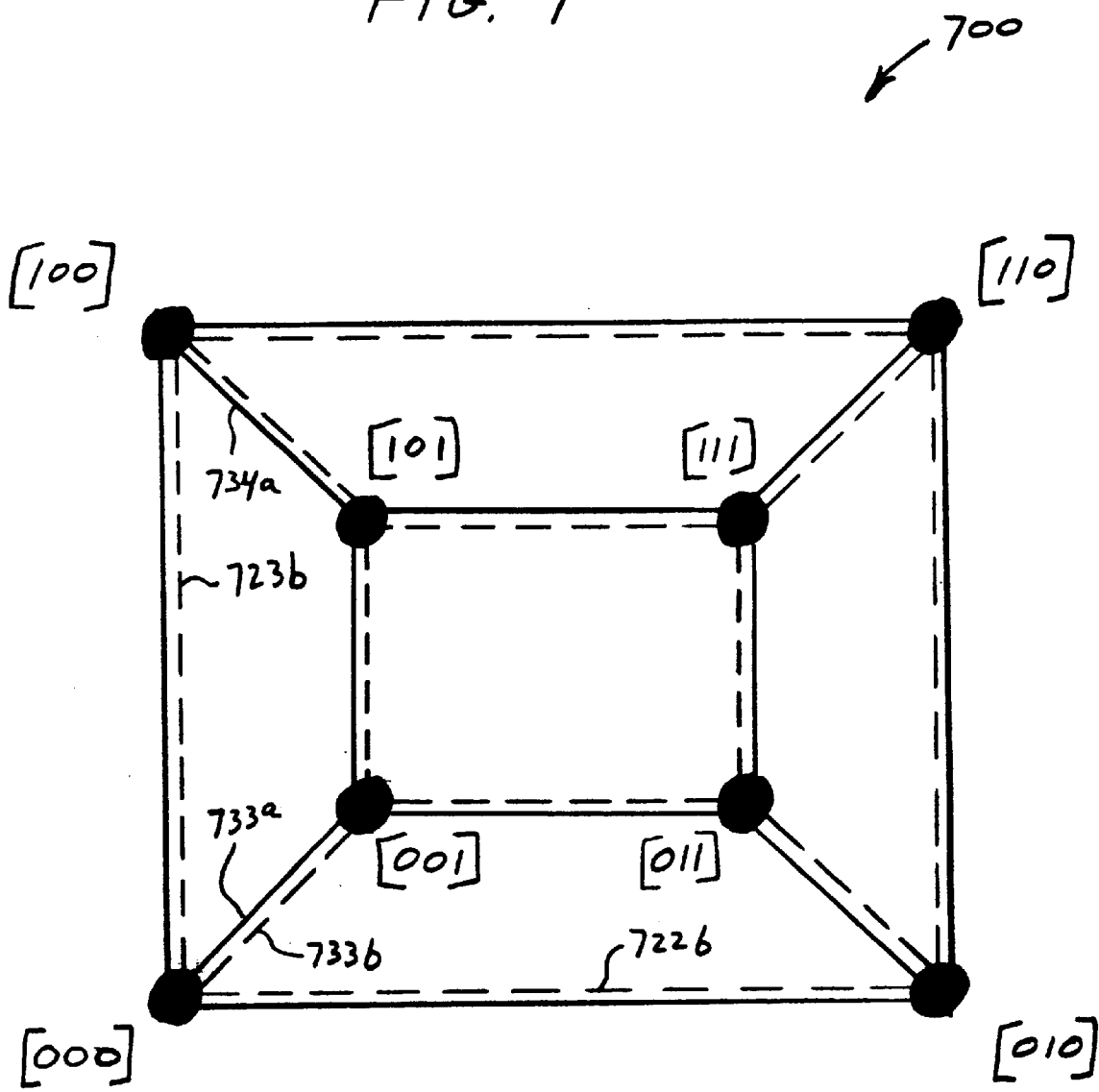

HYPERCUBE ROUTING AND RESTORATION IN TELECOMMUNICATIONS NETWORKS

CROSS-REFERENCE TO RELATED PATENT APPLICATION

This patent application is a continuation application of Ser. No. 08/837,683, filed Apr. 21, 1997, all of which is incorporated herein by reference.

BACKGROUND OF THE INVENTION

This invention relates to telecommunications networks. More particularly, this invention relates to an improved network architecture for more effectively routing traffic and recovering from failures.

A telecommunications network transports information from a source to a destination. The source and destination may be in close proximity, such as in an office environment, or thousands of miles apart, such as in a long distance telephone system. The information, which may be, for example, computer data, voice transmissions, or video programming, is known as traffic, and enters a network usually at a node and is transported through the network via links and other nodes until a destination is reached. Nodes are devices or structures that direct traffic; they add new traffic to the network, drop traffic from the network, and route traffic from one portion of the network to another. Links are the transmission paths interconnecting the nodes.

Nodes range in complexity from simple switching or relay devices to entire buildings containing thousands of devices and controls. Nodes can be completely controlled by a central network controller or can be programmed with varying degrees of automated traffic-managing capabilities. The implementation of nodes, which is known in the art, is accomplished either electronically, mechanically, optically, or in combinations thereof.

Links are typically either coaxial cable or fiber-optic cable, but can be any transmission medium capable of transporting traffic. Individual links can vary in length from a few feet to hundreds of miles. Links that are part of a larger network, such as a telephone system, are usually carried on overhead utility poles, in underground conduits, or in combinations of both. Generally, links are either working links or protection links. Working links provide dedicated pathways for transporting traffic, while protection links, which do not regularly transport traffic, provide alternative pathways should a working link become inoperative. A link can become inoperative in a number of ways, but most often, when it is cut. This usually occurs, for example, when excavation severs an underground link, or when a traffic accident or storm damages a utility pole carrying a link.

The volume of traffic transported by a network can be significant. Typical transfer rates for a fiber-optic link can range from 2.5 gigabits per second to 10 gigabits per second. A "gigabit" is a billion bits, and a "bit" is a binary digit (a logical 1 or 0), which is the basic unit of digitized data. Digitized data is a coded sequence of bits, and traffic is typically transported in that form.

Because of the significant volume of traffic typically transported by a network, any disruption in traffic flow can be devastating. Of particular concern are telephone networks, which can transport thousands of individual communications simultaneously. Thus the ability to restore network service should a portion of the network become inoperative is of high priority. Moreover, to ensure that the network is implemented and managed in a cost effective manner, proper allocation of link resources is also of high priority.

Network architecture (the manner in which nodes and links are configured and traffic is controlled) plays a significant role in both the cost-effective implementation and management of a network and the ability of a network to quickly recover from traffic flow disruptions. In one known mesh network, a central controller monitors and controls traffic flow throughout the network. Complex traffic routing and recovery algorithms are used to manage traffic flow. A simplified portion of this network is shown in FIG. 1. Each node 102 communicates with controller 104, sending status and receiving instructions for properly routing traffic. Each node is interconnected with other nodes by working links 106 (indicated by solid lines) and selectively placed protection links 108 (indicated by dashed lines). (For clarity, not all nodes and links in FIG. 1 are identified with reference numerals.)

When a link becomes inoperative, the nodes connected to the inoperative link immediately notify the controller. The controller then determines if an alternative traffic path can be configured with either protection links, spare capacity on working links, or combinations of both. If an alternative path is found, the controller sends appropriate instructions to those nodes that can interconnect the identified links to form the alternative path. Typical recovery time from such a disruption is approximately two seconds. This recovery time was once hailed as a marvel of technology; today, however, it is no longer acceptable. A two-second outage would adversely affect, for example, the transmission of computer data. In fact, an entire computer center could be adversely affected by such an outage.

To improve recovery times, other known mesh networks provide decentralized node control. In these networks, individual nodes, in cooperation with adjacent nodes, routinely route traffic and respond to path failures without significant interaction with the central controller. By communicating locally among themselves, these nodes can, for example, recover from path failures by configuring alternative paths and rerouting traffic to those alternative paths. Decentralized node control has improved recovery times to the millisecond range (thousandths of a second).

Furthermore, restorative capability in these networks has been improved by providing each nodal interconnection with a protection link. This additional protection link coverage increases the likelihood that alternative paths can be configured for most typical path failures.

These improvements, however, have also resulted in several disadvantages. For example, decentralized node control undesirably requires a great deal of inter-nodal communication, which must be supported with increased link capacity and more complex nodes. Nodes must be able to send, receive, analyze, and respond to various inter-nodal traffic management communications, and working link capacity must be increased to transport those communications. Moreover, the additional protection link coverage further increases equipment and maintenance costs. Thus these improvements have undesirably resulted in a more costly network, both in terms of original equipment and the associated maintenance of that equipment.

Networks employing architectures other than mesh configurations are also known. Ring networks, for example, interconnect nodes in a circular fashion to form rings. The rings are then interconnected to form a complete network. Control in this type of network is also decentralized, enabling nodes within each ring to make limited traffic routing decisions. Although the rings are interconnected, each ring operates substantially independently of the others, thus desirably reducing the possibility of a network-wide failure, which a centrally controlled network is susceptible to. Ring networks have further improved recovery times to the microsecond range (millionths of a second). In that short amount of time, telephone customers would not realize that the path carrying their call was cut and rerouted, and transmitted computer data would likely suffer the loss of only a few hundred bits of data, which would simply require retransmission of the lost bits.

A portion of such a ring network is shown in FIG. 2A. Network 200 includes nodes 202, 204, 206, 208, and 210. Each node is connected to working links, indicated by solid lines (such as working link 212), and protection links, indicated by dashed lines (such as protection link 214). (For clarity, only the working and protection links of one link pair are identified with reference numerals in FIG. 2A.)

A ring recovers from a cut link pair generally as follows: assume the working and protection links between nodes 202 and 204 are cut. Nodes 202 and 204 communicate with adjacent nodes 210 and 206, respectively, which in turn both communicate with node 208 to switch disrupted traffic to the protection links. Traffic flow is thus restored between nodes 202 and 204 by rerouting disrupted traffic back around the ring through protection links.

A disadvantage of this ring network is that restoration is limited to substantially only one inoperative link pair per ring. If, for example, two link pairs were cut in the same ring, traffic flow could not be restored until at least one of the link pairs was physically repaired. This disadvantage is not shared by the previously described mesh network, because most nodes in a mesh network are usually connected to three or more other nodes, increasing the likelihood that a sufficient number of protection links can be configured to completely restore disrupted traffic flow.

A further disadvantage is the high percentage of links deployed for protection—a full 50% around the entire ring. Moreover, the traffic-bearing capacity of the protection links is substantially the same as the working links. Thus, half the link capacity in the network either sits idle, or, at best, is underutilized with nonessential or low priority activity until needed to restore disrupted traffic flow. This high percentage of underutilized link capacity is undesirable in today's competitive cost-conscious environment.

A still further disadvantage of this ring network is the susceptibility of complete inter-ring communication failure should the interconnecting node fail (i.e., node 210 in FIG. 2A). To guard against such failures, other known ring networks have been developed with DRI (Dual Ring Interworking). This ring architecture, shown in FIG. 2B, provides two copies of inter-ring traffic between each pair of rings. One copy is transported through each of redundant paths 252 and 254. Should there be an inter-link or inter-node failure, the network automatically uses the other copy of the transmitted inter-ring traffic. Unfortunately, however, this architecture undesirably requires additional link and node resources that accordingly reduce the cost effectiveness of the network.

In view of the foregoing, it would be desirable to provide a network architecture for a telecommunications network that more cost effectively provides high levels of traffic routing diversity and restorative capability.

It would also be desirable to provide a network architecture for a telecommunications network that provides decentralized node control requiring less inter-nodal communication.

It would further be desirable to provide a network architecture for a telecommunications network that offers high levels of restorative capability with protection links of less traffic-bearing capacity.

It would still further be desirable to provide a network architecture for a telecommunications network that operates with less complex traffic routing and recovery algorithms.

SUMMARY OF THE INVENTION

In accordance with the present invention, a network architecture is provided for configuring a telecommunications network into a plurality of n-dimensional hypercubes, the network having a plurality of nodes and a plurality of links, and "n" being an integer greater than or equal to three. Each hypercube is interconnected with at least one other hypercube and has $2^n$ vertex nodes. Each vertex node has a degree n, meaning that it is connected with links to n other vertex nodes.

Additional features include decentralized node control, substantially independent traffic management within each hypercube, working and protection links with less traffic-bearing capacity, unique vertex node labeling that reduces inter-nodal communication, and less complex traffic routing and recovery algorithms.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 3A:
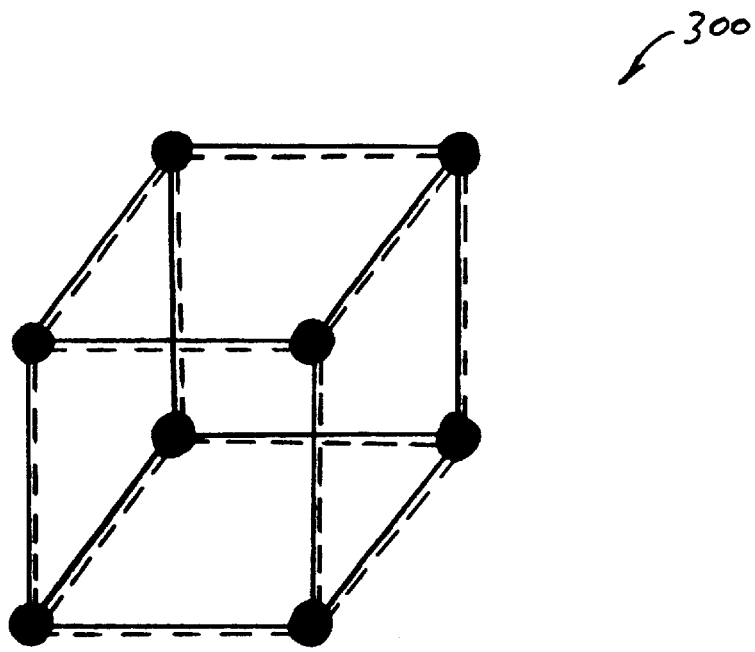
FIGS. 3A and 3B are portions of a 3-dimensional hypercube network according to the present invention.

The present invention provides a telecommunications network architecture in which nodes and links are configured in chains of interconnected n-dimensional hypercubes, where "n" is an integer greater than or equal to three. Each hypercube has $2^n$ vertex nodes and at least $n \cdot 2^{(n-1)}$ working links interconnecting the nodes. Each vertex node in an n-dimensional hypercube is of degree n, meaning that it is connected to n other vertex nodes within that hypercube. Each nodal interconnection advantageously includes a protection link. There are thus $n \cdot 2^{(n-1)}$ protection links interconnecting the vertex nodes of each n-dimensional hypercube. A portion of a 3-dimensional hypercube network is shown in FIG. 3A. Hypercube 300 has $2^3=8$ vertex nodes of degree 3 interconnected with $3 \cdot 2^{(3-1)}=12$ working links (indicated by solid lines) and 12 protection links (indicated by dashed lines).

Working links provide dedicated pathways for transporting information, known as traffic, while protection links, which do not regularly transport traffic, provide alternative pathways should working links become inoperative. Links typically become inoperative when they are cut. Both working links and protection links are advantageously fiber-optic cable, but can also be any transmission medium capable of transporting traffic (e.g., coaxial cable). Traffic flow through links is bidirectional, that is, traffic can flow upstream through a link while other traffic can flow downstream through the same link simultaneously.

Nodes are devices or structures that direct traffic into, out of, and through the network. They can be implemented electronically, mechanically, optically, or in combinations thereof, and are known in the art. Advantageously, node control is decentralized, giving nodes the capability of making limited traffic routing decisions without interacting with a central network controller.

Figure 3B:
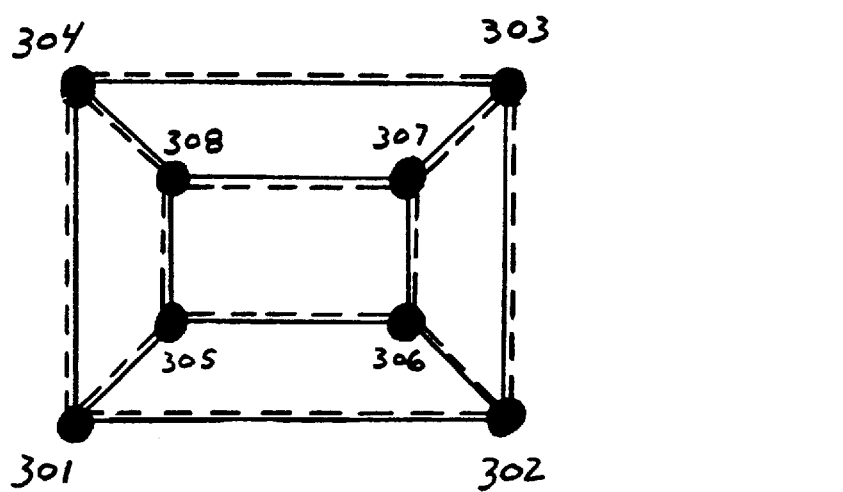

An advantage of hypercube networks is the n node-disjoint paths connecting each vertex node to every other vertex node within the same hypercube. Paths are node disjoint if they do not have any nodes in common; they are independent of each other. Traffic can thus be routed from each node to every other destination node through any of the n node-disjoint paths. For example, referring to FIG. 3B, in which hypercube 300 has been redrawn, traffic can be routed from node 301 to node 308 through any of the following three node-disjoint paths:

301→305→308

301→304→308

301→302→306→307→308.

Figure 4:
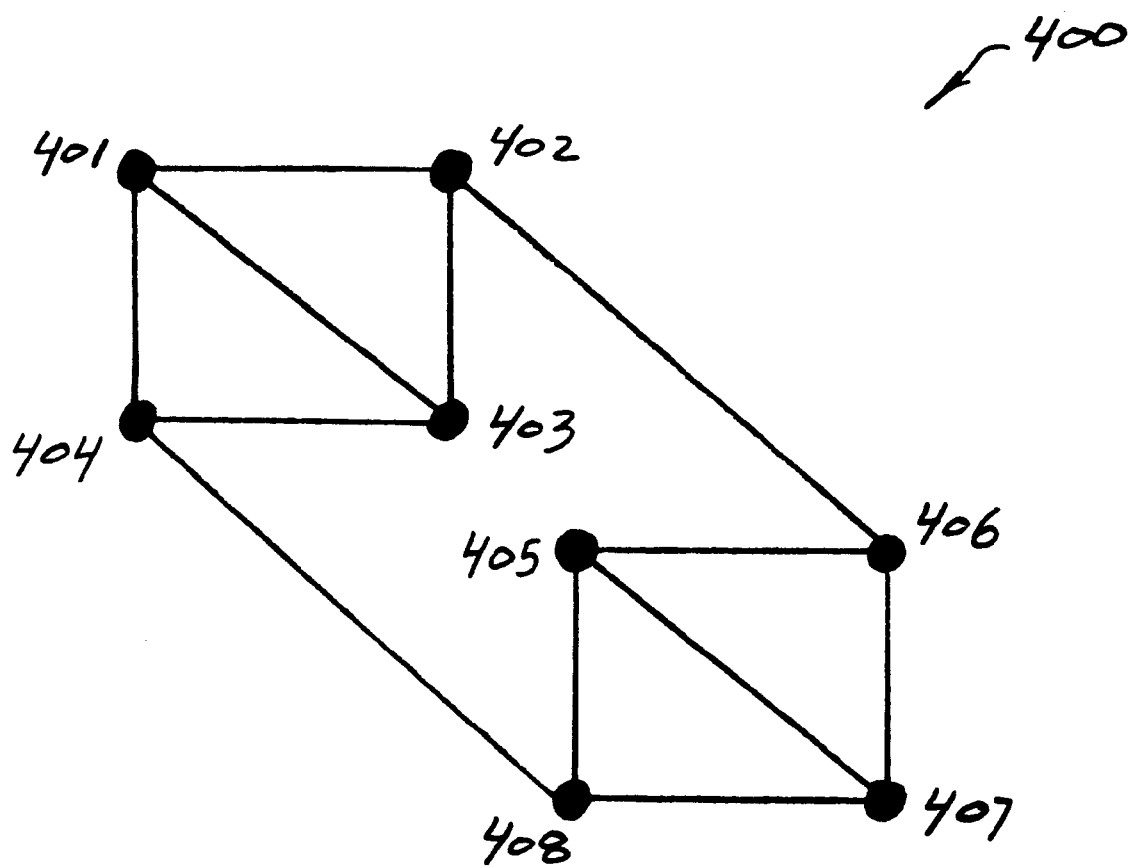
FIG. 4 is a 3-dimensional non-hypercube network.

In contrast, the n=3 network illustrated in FIG. 4 is not a hypercube network, because, even though it has $2^n$ vertex nodes of degree n interconnected with $n \cdot 2^{(n-1)}$ links, each vertex node does not have n node-disjoint paths connecting it to every other vertex node within the network. For example, three node-disjoint paths from node 403 to node 406 are not possible; at least two paths must pass through either node 402 or 404.

Node-disjoint paths provide several routing and recovery advantages. First, traffic loads can be better balanced. For example, instead of routing all traffic through one path, possibly overburdening it, traffic can be apportioned and routed to one or more underutilized paths as well, thus more efficiently using the available link capacity.

Another advantage is that overall link capacity per length can be reduced. Rather than routing a large volume of traffic to a destination node through one path, traffic can be apportioned across all available node-disjoint paths, which are typically not the same lengths, thus advantageously permitting some longer links to be of a lesser traffic-bearing capacity.

The greater traffic routing diversity provided by the n node-disjoint paths also affords greater protection against typical path failures. If a link or node fails, there are still n−1 node-disjoint alternative paths that can be configured (assuming the nth protection link is unusable because it is either connected to the failed node or has itself failed in the same manner as the failed working link, which is common). Contrast this with the one alternative path typically available in a ring network.

Furthermore, each protection link in the hypercube can be of a lesser traffic-bearing capacity than that of the working links, because the disrupted traffic can be apportioned across the n−1 node-disjoint alternative paths. For example, traffic disrupted by a link failure in a 3-dimensional hypercube network can be apportioned and rerouted through two node-disjoint alternative paths. Thus, each path can be half the capacity of the failed working link. These advantages permit links of less capacity to be installed, which accordingly improves the cost effectiveness of a network, while still providing a high level of restorative capability.

Figure 5:
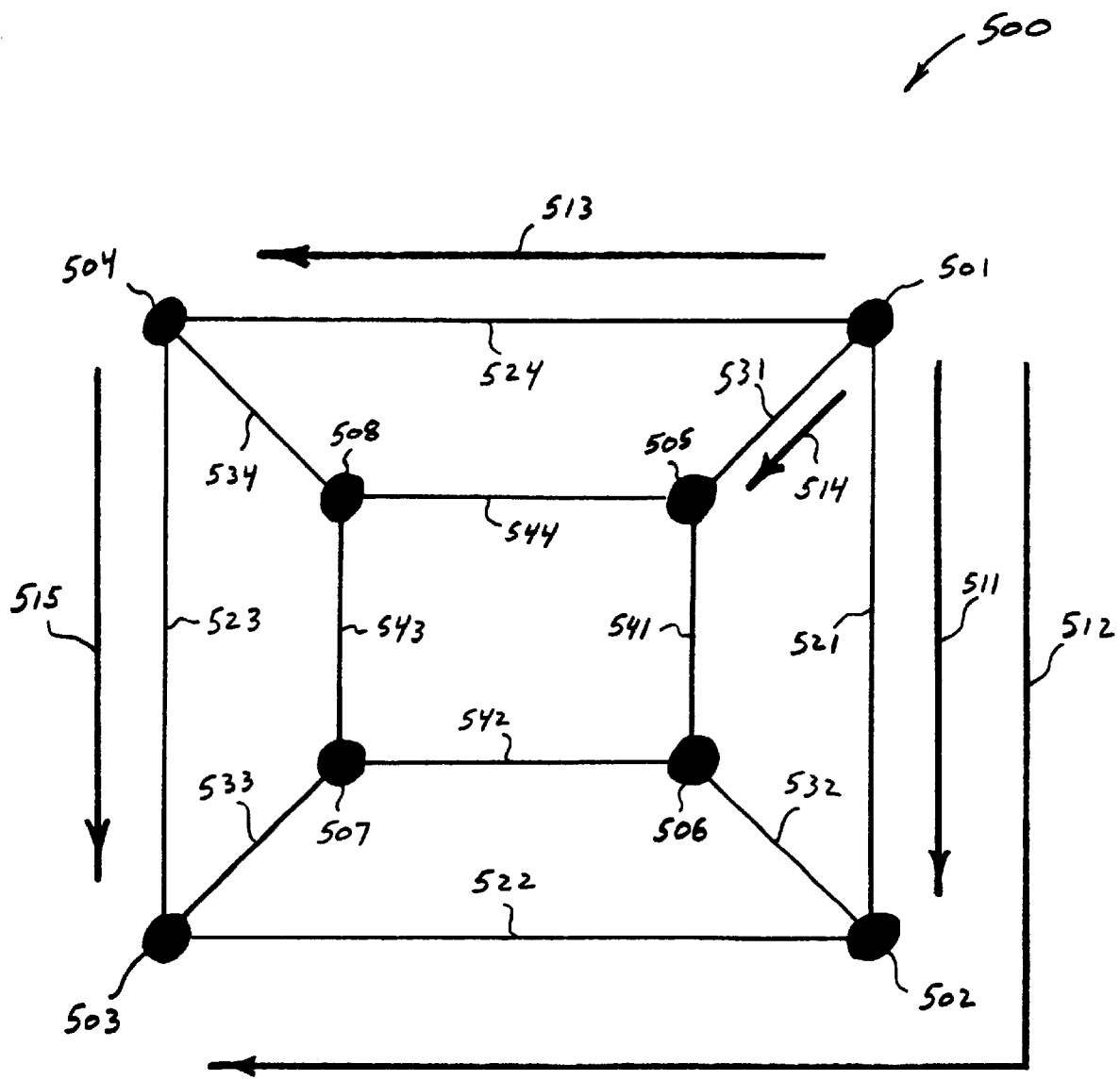
FIG. 5 is a portion of a 3-dimensional hypercube network representing a regional access network according to the present invention.
Figure 6:
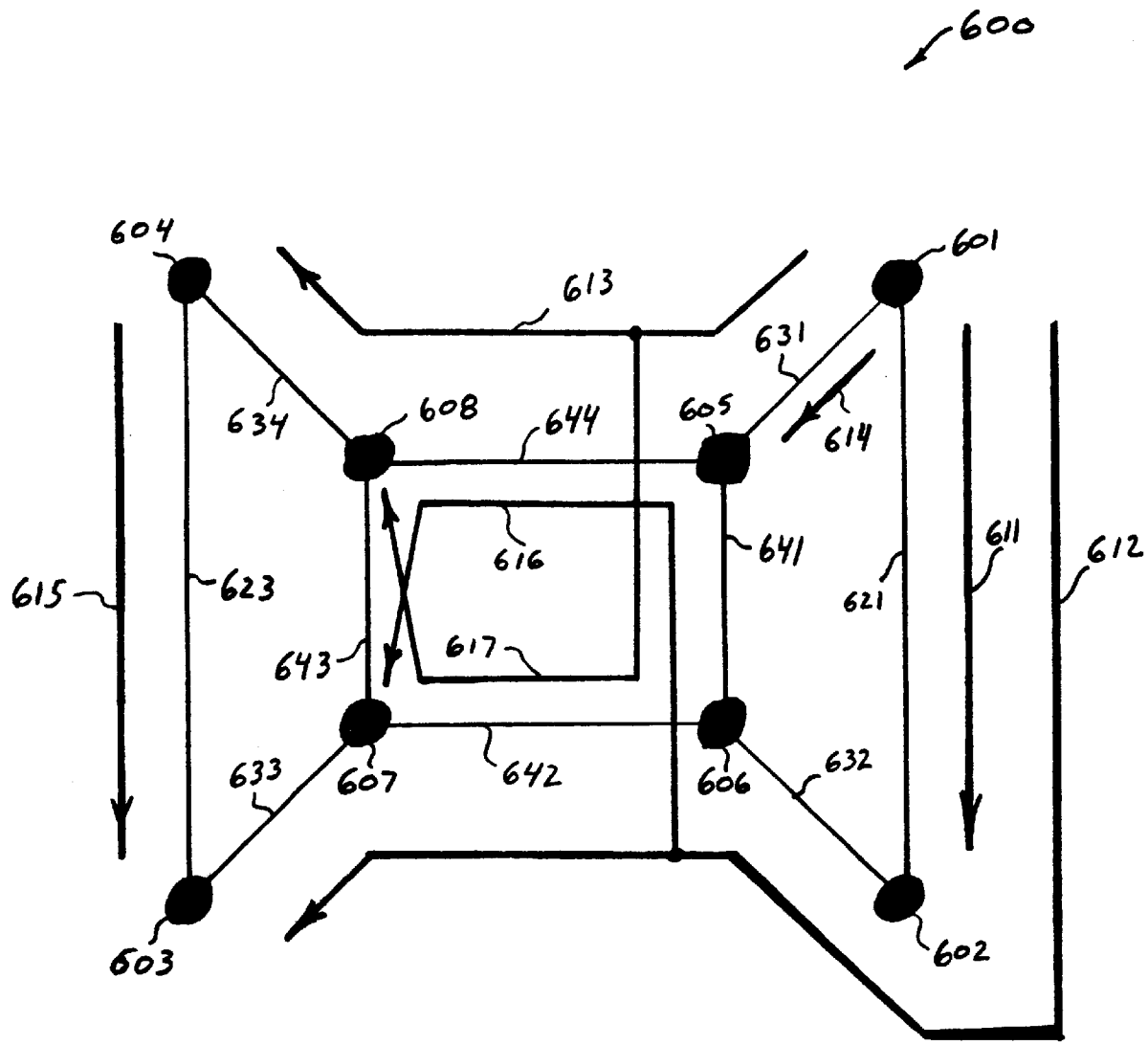
FIG. 6 is a portion of a prior art DRI ring network.

To quantitatively illustrate the advantages of the present invention, compare the portion of a 3-dimensional hypercube network shown in FIG. 5 with the comparable portion of a DRI ring network shown in FIG. 6 (for clarity, protection links are not shown). Each configuration may be used to implement a portion of a long distance telephone system, such as, for example, a regional access network. Note the structural difference between hypercube 500 and DRI ring network 600—the addition of links 522 and 524 in hypercube 500. While it may seem contradictory to lo add links to a network to both reduce link capacity and improve cost effectiveness, the following example demonstrates these advantages by doing just that.

Assume the following traffic volumes: node 501 routes 10 units of traffic respectively to nodes 502, 503, 504, and 505, and node 504 routes 10 units of traffic to node 503. This traffic is transported via paths shown by arrows 511, 512, 513, 514, and 515. Further assume that links interconnecting the nodes are of the following lengths (which are reasonable for a regional access network):

links 521/522/523/524=100 miles each links 531/532/533/534=35 miles each links 541/542/543/544=50 miles each Similarly for network 600, assume node 601 routes 10 units of traffic respectively to nodes 602, 603, 604, and 605, and that node 604 routes 10 units of traffic to node 603. This traffic is transported via paths shown by arrows 611, 612, 613, 614, 615, 616, and 617. Arrows 616 and 617 indicate the redundant inter-ring traffic that DRI ring networks typically provide. Similarly, the links interconnecting the nodes are of the following lengths:

links 621/623=100 miles each links 631/632/633/634=35 miles each links 641/642/643/644=50 miles each Note that links 621/632/641/631 form one ring in network 600 and that links 623/634/643/633 form a second ring. Further note that all links in a ring are substantially of the same capacity to ensure that a particular volume of traffic at any given node in the ring can be transported to any other node in the ring. This requirement does not apply to hypercube networks because of the n node-disjoint paths available to each node for routing traffic.

To route the particular traffic given above, the required link capacities per length for hypercube 500 are as follows:

link 521: 20 unit capacity for 100 miles link 522: 10 unit capacity for 100 miles link 523: 10 unit capacity for 100 miles link 524: 10 unit capacity for 100 miles link 531: 10 unit capacity for 35 miles The required link capacities per length for DRI ring network 600 are as follows:

links 621/632/641/631: 20 unit capacity for 220 miles
links 623/634/643/633: 10 unit capacity for 220 miles
link 642: 20 unit capacity for 50 miles
link 644: 20 unit capacity for 50 miles The cost effectiveness of a network can be measured in part by the cost of each link, which is a function of its length and capacity. A cost factor can be calculated by multiplying the length of the link by its capacity. The higher the cost factor, the higher the cost. Accordingly, to transport the volume of traffic given above, hypercube 500 has a cost factor of 5350, while DRI ring network 600 has a cost factor of 8600—approximately 61% more than hypercube 500. Thus, to transport the same traffic, to the same nodes, the same distances apart, hypercube 500 is 38% more cost effective than DRI ring network 600, even with an additional 200 miles of links (i.e., links 522 and 524). While other traffic volume and flow path scenarios may result is somewhat different percentages, the net result will generally be the same—the hypercube network is more cost effective.

Similar results are obtained when comparing the capacities and lengths of protection links needed to recover from single link or node failures. Because of the n−1 node-disjoint protection paths available to each node connected to a single path failure, the traffic-bearing capacity of each protection link can be less than that of the affected working link. For example, to recover from a single link failure in hypercube 500, protection links need only 50% of the capacity of the affected working link, because disrupted traffic can be apportioned across the two available protection links. To the contrary, protection links in the rings of DRI ring network 600 are usually of the same capacity as working links, because there is typically only one protection path available to transport all of the disrupted traffic when a single link or node fails. In sum, hypercube networks more efficiently deploy both working and protection link capacity.

Each hypercube in a hypercube network operates substantially independently of other hypercubes, similar to the operational independence of individual rings in a ring network. Advantageously, traffic routing and path failure restoration is accomplished with algorithms that operate substantially within the boundaries of a particular hypercube. Thus the complexity of such algorithms is reduced, because routing and recovery is focused on only traffic flow within that particular hypercube. Such a reduction in complexity cannot be easily obtained, for example, in the previously described mesh networks, because there are no well defined internal boundaries within which to limit the operation of such algorithms.

Figure 7:
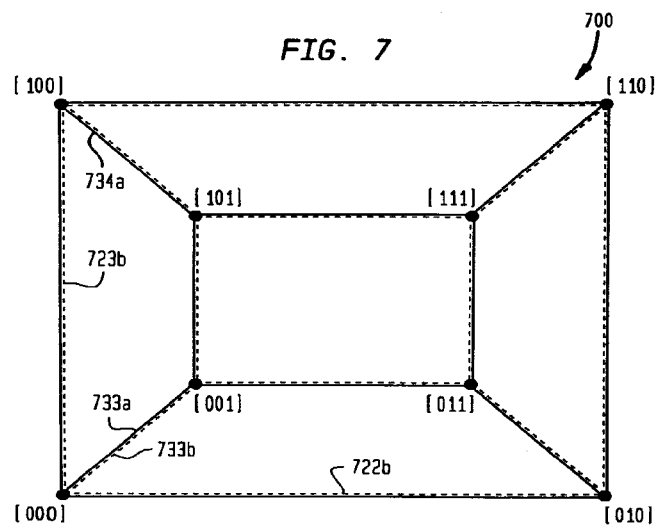
FIG. 7 is a portion of a 3-dimensional hypercube network with node labeling according to the present invention.
Figure 8:
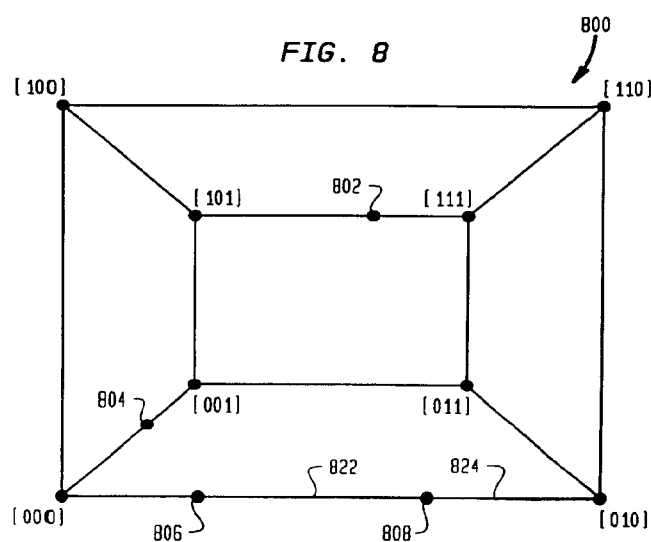
Figure 9A:
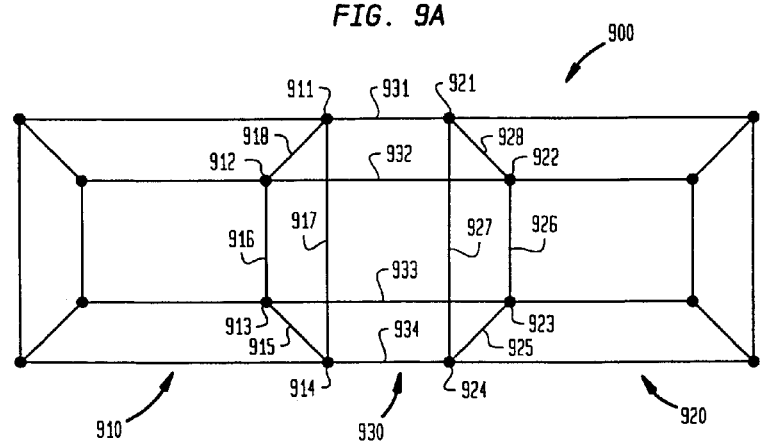
Figure 9B:
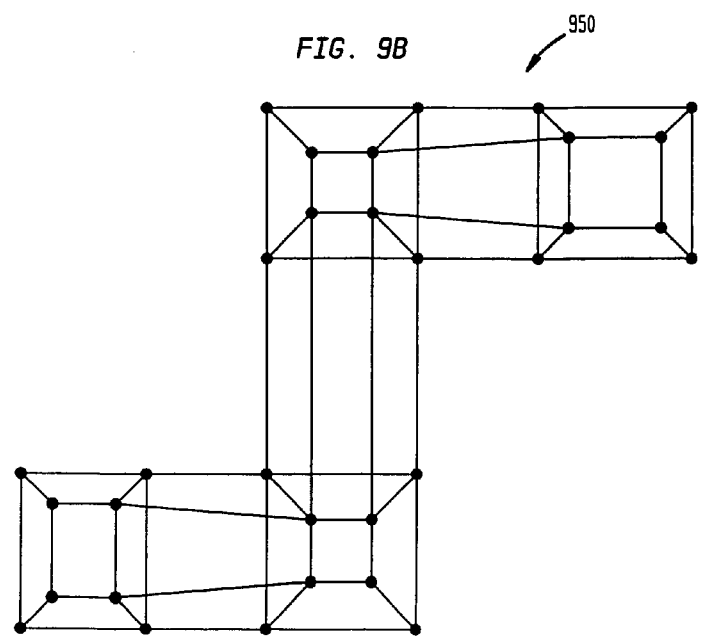
Figure 10A:
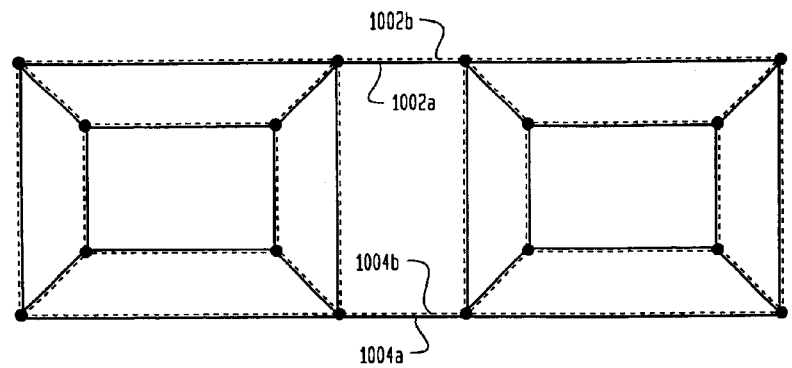
Figure 10B:
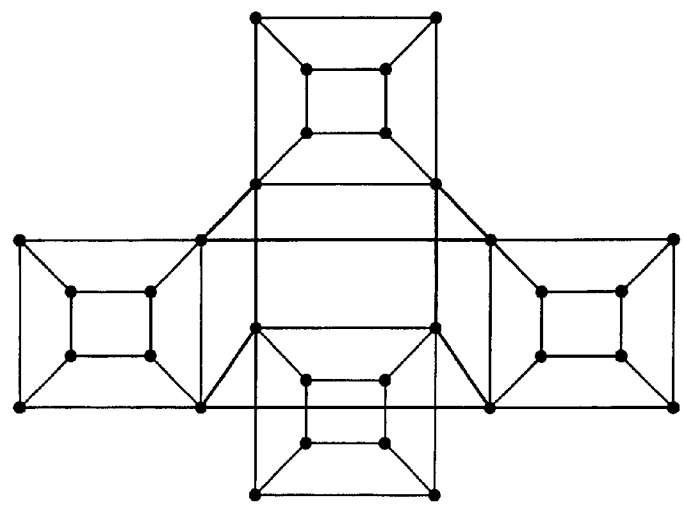
Figure 11:
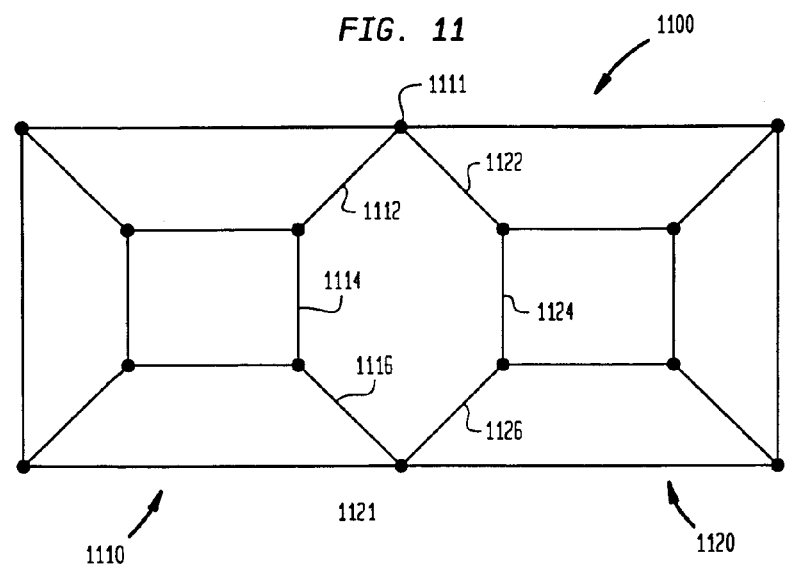

To facilitate traffic routing and recovery further, each vertex node is assigned a label unique to its particular hypercube. The label has a number of bit positions, and labels of interconnected adjacent vertex nodes within the same hypercube differ from each other by one bit in one bit position. To illustrate, a portion of a 3-dimensional hypercube network is shown in FIG. 7 with vertex nodes assigned unique three-bit labels. (Node labels are bracketed in the drawings to distinguish them from reference numerals.) The interconnected adjacent nodes to node 000, for example, are nodes 001, 010, and 100, each of which differs from node 000 by one bit in one bit position. To distinguish nodes of one hypercube from nodes of other hypercubes, hypercube labeling (not shown) is also provided. Hypercube labeling is used to route traffic from one hypercube to another, and is not ordinarily used once traffic enters a particular hypercube.

Many algorithms for routing traffic within a hypercube are possible. Algorithms may be based, for example, on a fixed traffic balancing objective or on a shortest-path strategy. Algorithms may also be dynamically based on varying traffic flow patterns or path utilization parameters. One algorithm for routing traffic within a hypercube is based on the differences between the labels of the current node, the predecessor node, and the destination node. This algorithm is less complex because it is advantageously based on the one bit in one bit position difference between labels of interconnected adjacent nodes.

The algorithm operates as follows to determine the next node to route traffic to: the receiving or current node first determines which bit position of its label contains a different value than the same bit position of the predecessor node label. That bit position is then excluded from further analysis. The current node then determines which of the remaining bit positions of its label contains a different value than the same bit positions of the label of the traffic's destination node (within that hypercube). The first bit position of the current node label having a different value than the destination node label adopts that value of the destination node label to create the label of a successor node, the bits of the other bit positions of the current node label remaining unchanged and forming the remainder of the successor node label. Each successive node applies the same algorithm until the destination node is reached. If that destination node is not the final destination, routing will continue similarly in subsequent hypercubes. The following example illustrates this algorithm for the portion of the 3-dimensional hypercube network shown in FIG. 7.

Assume node 011 receives traffic from node 010 and that the destination node is 100. Node 011 first excludes bit position three from further analysis because it has a different value than that of the same bit position of the predecessor node label, as shown below.

| label bit position: | 1 | 2 | 3 |
|---|---|---|---|
| predecessor node label: | 0 | 1 | 0 |
| current node label: | 0 | 1 | 1 |
| result: | 0 | 1 | x |

Bit positions one and two are thus left for comparison with the destination node label. Node 011 then looks for the first bit position containing a different value than that of the destination node label. Bit position one is the first bit position to contain a different value:

| previous result: | 0 | 1 | x |
|---|---|---|---|
| destination node label: | 1 | 0 | x |
| first bit position: | * | | |

Accordingly, node 011 then determines the successor node label by adopting the value of bit position one of the destination node label, while maintaining the value of bit positions two and three of its label:

| destination node label: | 1 | – | – |
|---|---|---|---|
| current node label: | – | 1 | 1 |

```
successor node label:    1  1  1
```

Thus the new node label becomes 111 and traffic is routed thereto. The algorithm is then repeated until the destination node is reached, as shown below.

010→011→111→101→100

For those cases where the labels of the current node and the destination node are different at more than one bit position, the above algorithm can be modified to adopt a subsequent bit position with a different value instead of the first bit position with a different value. For example, referring to the example above, at current node 011, instead of adopting bit position one as the bit position for determining the successor node label, bit position two could have been adopted instead, because it too contained a different value than that of the destination node label:

```
previous result:         0  1  x
destination node label:  1  0  x
second bit position:        *
```

Thus, the value of the destination node label's bit position two, along with the values of the current node label's bit positions one and three, could have been used to determine a successor node label of 001 instead of node label 111, as shown below.

```
destination node label:  -  0  -
current node label:      0  -  1 successor node label:    0  0  1
```

The path to destination node 100 would have alternatively been:

010→011→001→000→100

Note that these two paths are advantageously node disjoint. Thus, by varying which bit position to use for determining the successor node label in those cases where node label differences between the current node and the destination node exist in more than one bit position, the algorithm advantageously provides alternative traffic paths.

Recovery from a traffic path failure can be accomplished with a recovery algorithm similar to the traffic routing algorithm. Note that the recovery algorithm is not predicated on the use of any particular routing algorithm; it operates independently of the routing algorithm used. Referring again to FIG. 7, assume working link 733a and protection link 733b fail. Assume further that traffic from node 000 is destined for node 011. Node 000 senses the path failure and, unlike the routing algorithm, recovery begins by automatically apportioning and rerouting the disrupted traffic to nodes 010 and 100 through the available n−1 protection links (i.e., links 722b and 723b). Advantageously, approximately half the traffic can be routed through each protection link. Thus each protection link can be approximately half the capacity of working link 733a. The recovery algorithm then determines in the same manner as the previously described routing algorithm the following alternative paths through which disrupted traffic is rerouted:

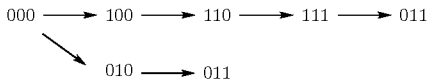

To restore traffic flow from node 001 to node 000 (assuming that node 000 is the destination node), the following alternative paths are similarly determined:

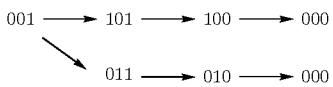

Note that each set of alternative paths is node disjoint. Note further that no portion of either set of alternative paths overlaps (i.e., routes traffic in the same direction). Thus reduced protection link capacity can be maintained throughout the hypercube for single link failures, provided that traffic being oppositely routed through the failing link does not have the same destination node. If such traffic does have the same destination node, which is highly unlikely since it is being routed in opposite directions, there may be some path overlap. In that case, either some traffic-transport delays will result, as the overlapping traffic waits for available capacity (assuming sufficient traffic buffers are available to temporarily hold that traffic), or protection link capacity may have to be increased to accommodate that overlapping traffic. The network operator must weigh the costs associated with providing additional protection link capacity against traffic-transport delays should the unlikely event of oppositely routed traffic having the same destination node occur.

To recover from a non-destination node failure, traffic is rerouted around the failed non-destination node in the same manner as that for link failures. A non-destination node is a node in which traffic does not leave the network or the hypercube, but is merely being routed to a successor node within the same hypercube. To illustrate recovery from a non-destination node failure, assume the following traffic pattern in FIG. 7: node 100 routes traffic to node 001, node 001 routes traffic to node 100, and node 111 routes traffic to node 100. Assume the traffic from these three nodes passes through node 101. Now assume that node 101 fails. The recovery algorithm apportions and reroutes disrupted traffic through protection links as follows:

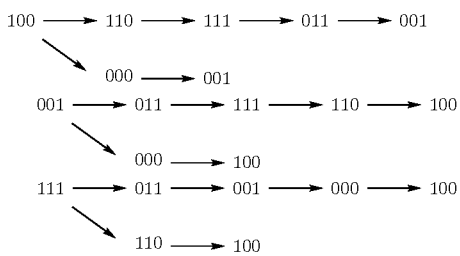

Although node-disjoint paths can no longer be assured (e.g., the path from 110 to 100 is used twice), the n−1 protection paths from each node still permit protection link capacities to be approximately 50% of that of working link 734a, which for this example, transports the largest volume of traffic. Therefore, high levels of restorative capability for single link or single node failures can be provided for hypercubes with protection links having traffic-bearing capacities of approximately 50% of the capacity of the largest working link in that hypercube.

Recovery from destination node failures is similar to the above, except that traffic destined for the failed node is dropped once the failure is confirmed. To confirm that a detected path failure is indeed the destination node or equivalent (i.e., all paths to the node have failed), the recovery algorithm operates as follows: upon detection of a path failure, disrupted traffic is rerouted as usual to available protection links. If no protection links are available, traffic is dropped. If an alternative path thereafter detects another path failure to the destination node, the recovery algorithm drops the traffic from that alternative path.

Alternatively, the recovery algorithm can be enhanced to include a back-up feature. Instead of dropping traffic if an alternative path detects another path failure, inquiries are first made to determine if any of the alternative paths have successfully reached the destination node. If an alternative path has successfully reached the destination node, then the disrupted traffic that was rerouted through unsuccessful alternative paths is "backed-up" and rerouted to the successful path. Only when each alternative path detects another path failure to the destination node will traffic be dropped, because it is then apparent that either all n links to the destination node have failed or the node itself has failed.

Recovery from multiple path failures detected by a single node is limited to the available number of protection links from that node. By a process of elimination, if one or-more of the n protection paths remain operative, traffic will be rerouted. If more than one path remains, traffic will be apportioned and rerouted as previously described. While multiple path failures from a single node are extremely rare, the greater path diversity of hypercube networks increases the likelihood that an alternative path will be available, as compared to the more limited restorative capability of ring networks. If greater recovery capability from multiple path failures is desired, the network operator must again weigh the costs associated with providing additional protection link capacity, which may be increased to an extreme of providing enough capacity such that disrupted traffic from all n–1 working links be accommodated through one protection link, against the traffic-transport delays that may result (assuming sufficient traffic buffers are available) should such unlikely multiple path failures occur.

To further improve the performance and cost effectiveness of hypercube networks, traffic is advantageously encoded with the label of its destination node. This information could be encoded, for example, on a subcarrier on an optical signal, or superimposed on the optical signal itself. It could also be encoded in a SONET (synchronized optical network) line overhead byte, which is known in the art. Each node can then independently determine the destination node of the traffic without any communication with other nodes or the controller. By eliminating the delays associated with inter-nodal and controller communication, traffic can be routed more quickly, thus improving network performance in general and restoration in particular. Furthermore, less inter-nodal communication requires less link resources to support that communication, and nodes no longer require the capability of sending, receiving, analyzing, and responding to that inter-nodal traffic-routing communication. Accordingly, less link resources and less complex nodes could be used, advantageously reducing network costs.

Traffic can be encoded at various points during its transmission through a network, and can be encoded with various node label information. For example, traffic can be encoded with both a hypercube label and a destination node label from that hypercube when it enters the network, or traffic can be encoded with a destination node label of a particular hypercube when it enters that hypercube. Alternatively, traffic may be routed without encoding until a path failure occurs. At which time, it is encoded with a destination node label, or, alternatively, the label of the next node in the path (i.e., the node on the other side of the path failure). Traffic encoding can therefore be customized to the particular needs or strategies of a network, or to the existing network resources that can take advantage of such encoding.

Figure 8:
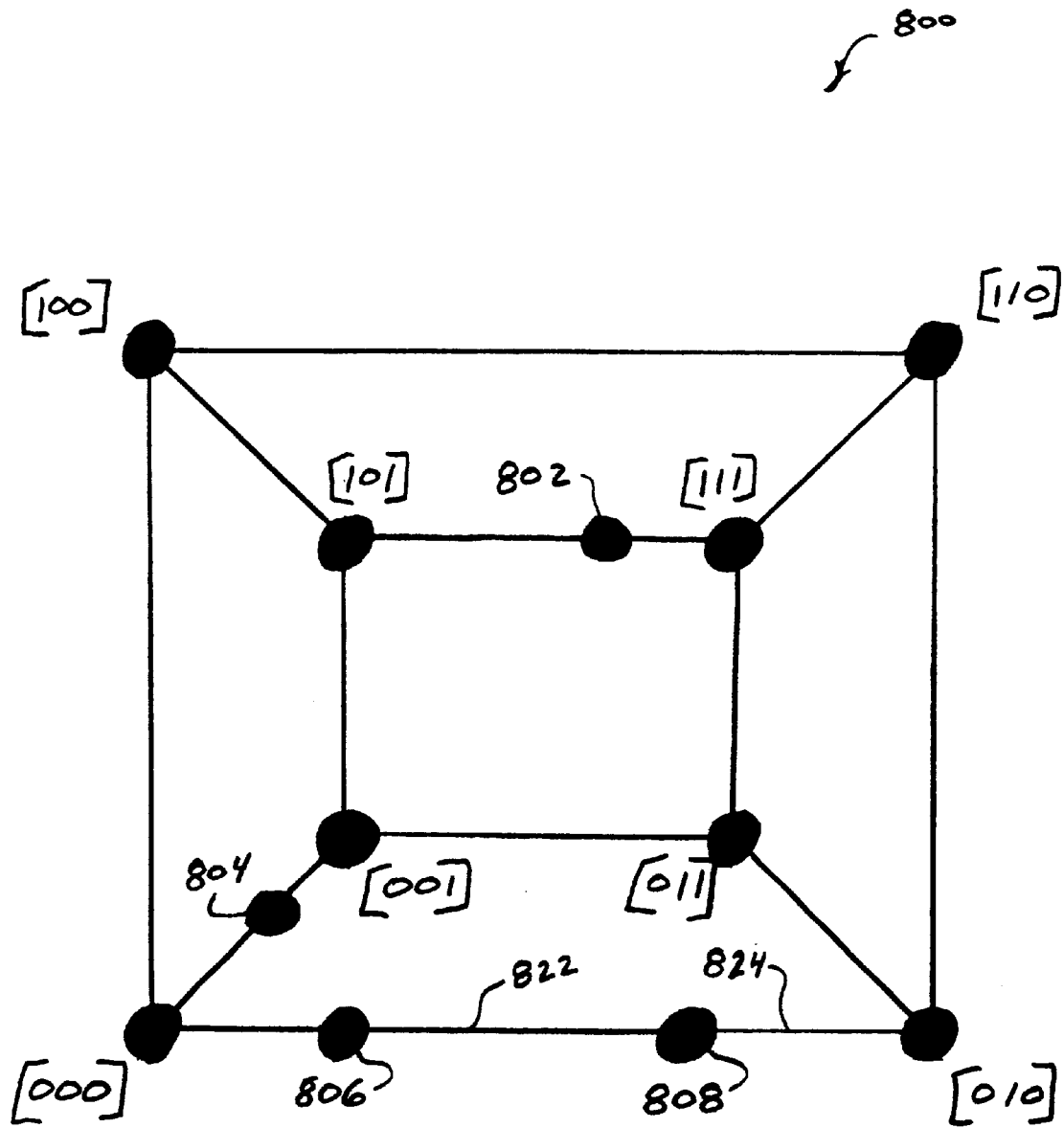
FIG. 8 is a portion of a 3-dimensional hypercube network with nodes of degree 2 according to the present invention.

Within each n-dimensional hypercube, nodes of degree less than n can be included without adversely affecting the advantages of n-dimensional hypercubes, particularly with respect to the algorithms for traffic routing and recovery. Nodes of degree less than n can be of degree 2 or higher. To illustrate, a 3-dimensional hypercube can include nodes 802, 804, 806, and 808 of degree 2, as shown in FIG. 8 (for clarity, protection links are not shown). Each degree 2 node is linked to two other nodes and is associated with a degree 3 node. The association with a degree 3 node is usually made at the time the degree 2 node comes on-line, and is typically made with the closest degree 3 node. For example, node 802 is associated with node 111, node 804 is associated with node 001, node 806 is associated with node 000, and node 808 is associated with node 010. When traffic is being routed to a degree 2 node, the routing algorithm operates as if the destination node were the associated degree 3 node. Upon receipt of the degree 2 node traffic, the associated degree 3 node then simply forwards that traffic to the degree 2 node.

Recovery algorithms operate similarly, as the following examples illustrate. Referring to FIG. 8, assume that link 822 fails. Traffic from node 806 is rerouted via a protection link to degree 3 node 000, and traffic from node 808 is rerouted via a protection link to degree 3 node 010. From there, alternative paths are configured as if the failed link directly affected both degree 3 nodes.

In this next example, assume that link 824 fails. Traffic from both nodes 806 and 808 are rerouted to node 000 via protection links. Again, alternative paths from nodes 000 and 010 are configured as if the failed link directly affected both nodes 000 and 010. However, in this case, node 000 also directs disrupted traffic to and from node 808, which was originally associated with node 010. Similarly, if a degree 3 node fails, the associated degree 2 node automatically becomes associated with the remaining interconnected degree 3 node, and restoration proceeds around the inoperative degree 3 node as described previously.

While the traffic routing and recovery principles of the present invention are easily extended to n-dimensional hypercubes with nodes of degree less than n, the capacity of protection links connected to these nodes, however, may have to be increased to compensate for having less protections links available than the degree n nodes, unless traffic-transport delays can be tolerated (again, assuming that sufficient traffic buffers are available). For example, as seen in the network of FIG. 8, a link failure to a degree 2 node typically results in only one protection link being available for recovery. Thus protection links connected to degree 2 nodes may have to be increased to accommodate the full capacity of traffic routed to and from these nodes if appropriate buffer hardware is unavailable or if traffic delays are unacceptable.

Network architectures in which the entire network is configured as a single n-dimensional hypercube are known. For example, it is known to configure a multiprocessor computer network having 512 nodes (which is a typical number of nodes in a telecommunications network) into a single 9-dimensional hypercube. Each node has 9 links connecting it to 9 other nodes. There are thus a total of $9 \cdot 2^{(9-1)} = 2{,}304$ links. Such a configuration is feasible for a computer system where the processors are in close proximity to one another. However, such a configuration would not be feasible in a wide area telecommunications network spanning hundreds of miles. The costs and complexities of installing and maintaining such an extensive network would be prohibitive. A further disadvantage would be the more complex traffic routing and recovery algorithms that would have to be used. A still further disadvantage would be the long recovery paths that would be typically configured; such paths would likely span hundreds, if not thousands, of miles.

Advantageously, a chain of interconnected hypercubes according to the present invention can be used to replace the single 9-dimensional hypercube network. This 512-node network could be configured, for example, as a chain of 64 interconnected 3-dimensional hypercubes. Such a network would require only 1020 links (12 links per hypercube plus 4 links per interconnection)—less than 45% of the links used to interconnect the single 9-dimensional hypercube. Such an implementation still offers high levels of traffic routing diversity and restorative capability—with far less link resources and less complex routing and recovery algorithms. Furthermore, disrupted traffic can be rerouted more quickly over shorter recovery paths than is likely in the single hypercube network.

Figure 9A:
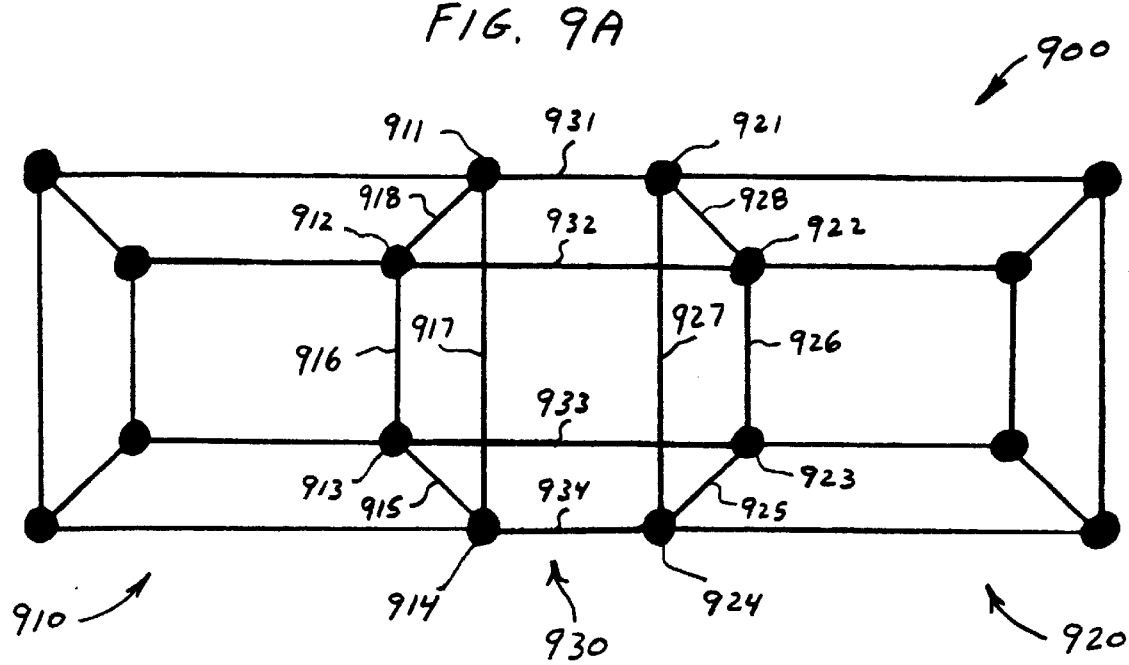
FIGS. 9A and 9B are interconnected portions of a 3-dimensional hypercube network according to the present invention.
Figure 9B:
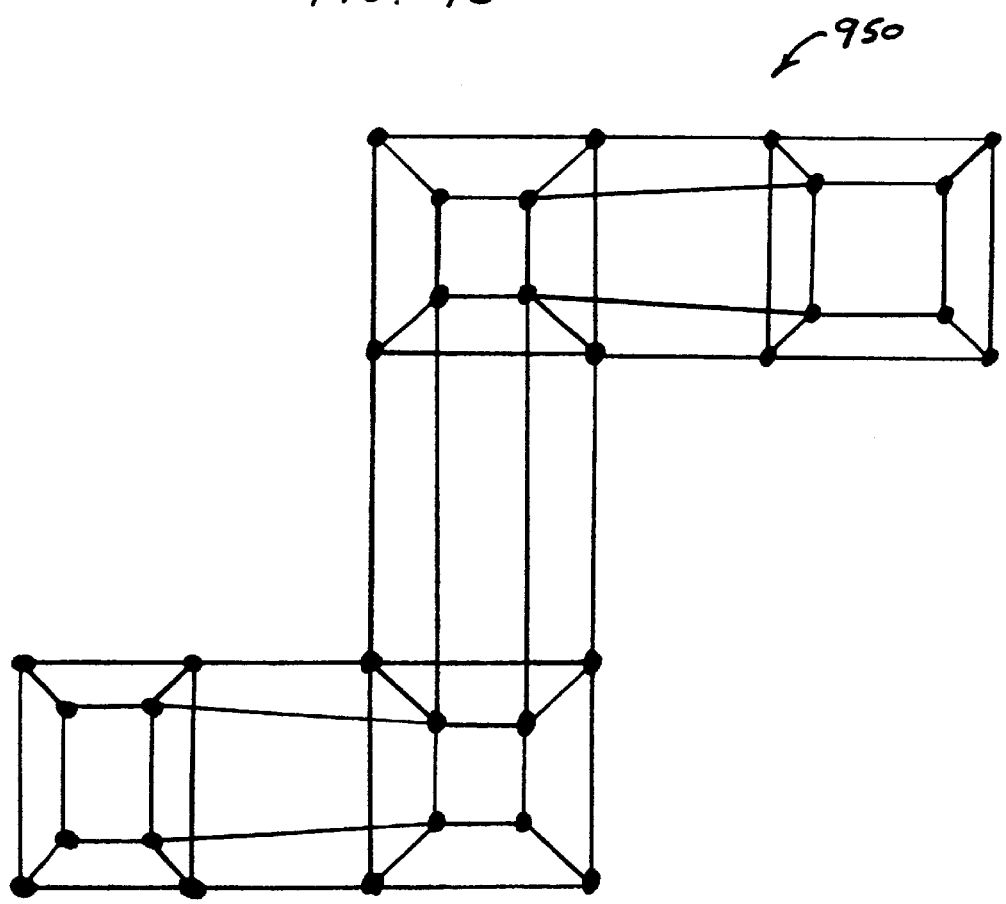

The interconnection of hypercubes can be accomplished in many ways. Advantageously, at least two nodes from each hypercube are part of the interconnection. More advantageously, $(\frac{1}{2}) \cdot 2^n$ nodes from each hypercube are part of the interconnection. To illustrate the more advantageous interconnection, a 3-dimensional hypercube is interconnected with another 3-dimensional hypercube as shown in FIG. 9A (for clarity, protection links are not shown). Each hypercube has $(\frac{1}{2}) \cdot 2^3 = 4$ nodes involved in the interconnection: nodes 911, 912, 913, and 914 from hypercube 910, and nodes 921, 922, 923, and 924 from hypercube 920. Interconnecting working links 931, 932, 933, and 934 complete the interconnection. Protection links (not shown) paralleling the interconnecting working links are also advantageously provided. A chain of such interconnected hypercubes is shown in FIG. 9B.

An advantage of this interconnection is that the interconnection itself forms a hypercube. Thus, traffic is advantageously never "between" hypercubes. The interconnection hypercube is formed with portions of each of the original hypercubes. Referring to FIG. 9A, nodes 911, 912, 913, and 914 and links 915, 916, 917, and 918 of hypercube 910 form one portion of interconnecting hypercube 930, and nodes 921, 922, 923, and 924 and links 925, 926, 927, and 928 of hypercube 920 form another portion of interconnecting hypercube 930.

Figure 1:
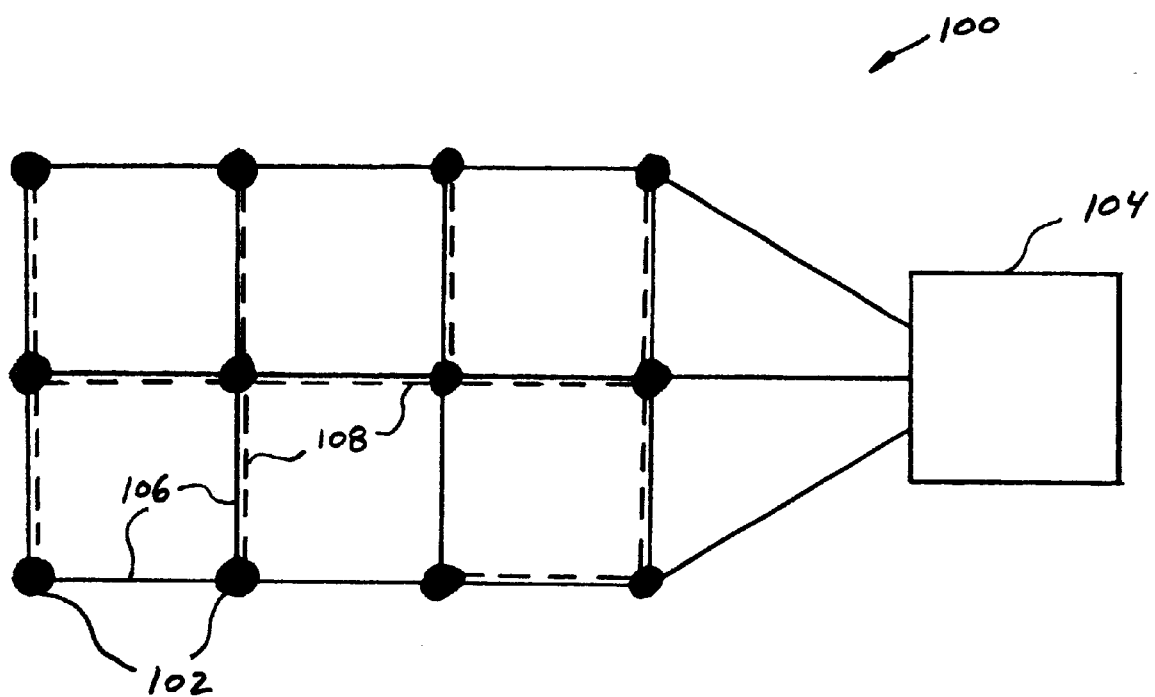
FIG. 1 is a simplified portion of a prior art mesh network.
Figure 2A:
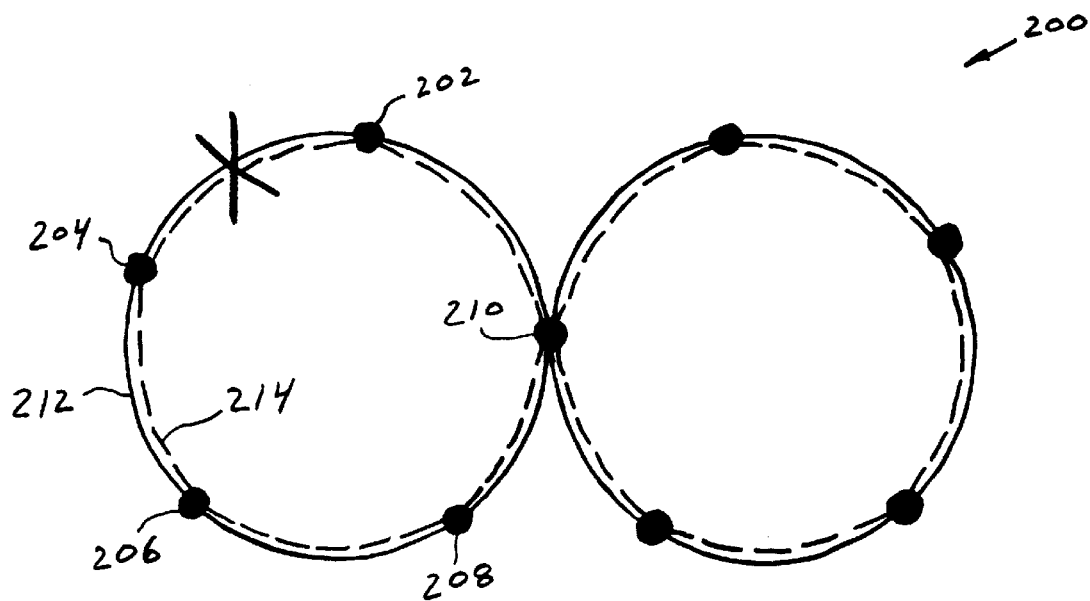
FIGS. 2A and 2B are portions of prior art ring networks.
Figure 2B:
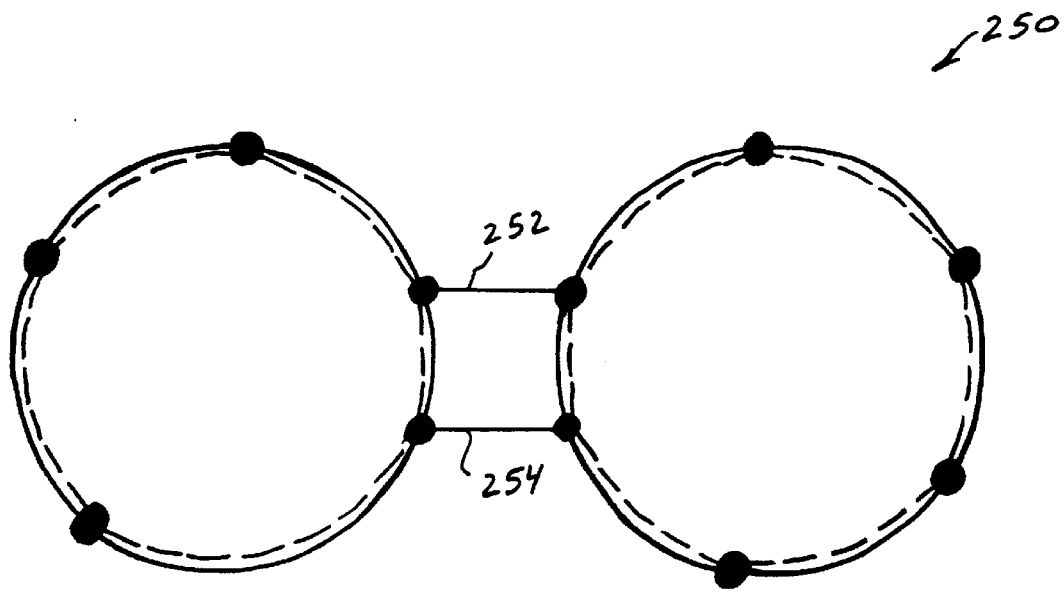

Accordingly, some vertex nodes form part of more than one hypercube. Thus to permit proper operation of routing and recovery algorithms in each hypercube, each vertex node is assigned a separate node label for each hypercube in which it forms a part. Therefore, because traffic is always in a hypercube, it can at all times be routed more efficiently with greater diversity and higher levels of restorative capability than, for example, DRI ring networks, where traffic is not always in a ring (e.g., when being transmitted through the redundant pair of links, such as links 252 and 254 of FIG. 2B).

Figure 10A:
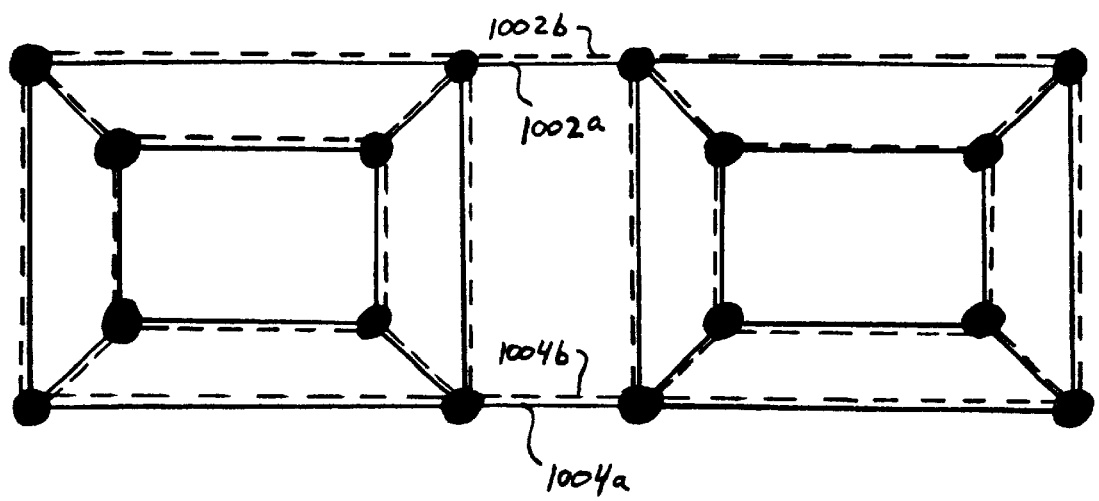
FIGS. 10A and 10B are alternatively interconnected portions of a 3-dimensional hypercube network according to the present invention.

An alternative interconnection is shown in FIG. 10A for a 3-dimensional hypercube network. This interconnection is formed with working links 1002a and 1004a and two nodes from each hypercube. Although an interconnecting hypercube is not formed in this interconnection, protection links 1002b and 1004b are advantageously provided to protect against the failure of either interconnecting working link. These protection links generally eliminate the need to provide redundant traffic through working links 1002a and 1004a as in DRI ring networks, thus permitting more effective use of the interconnecting link capacity.

If the inter-ring redundant traffic of DRI ring networks is desired, doing so in the hypercube network of FIG. 10A, for example, may result in less of a link capacity penalty than in DRI ring networks, because links in a hypercube network do not require the uniform traffic-bearing capacity of links in a ring network, as discussed previously. Thus link capacities in a hypercube network can be better customized to lessen the undesirable effects of DRI.

Figure 10B:
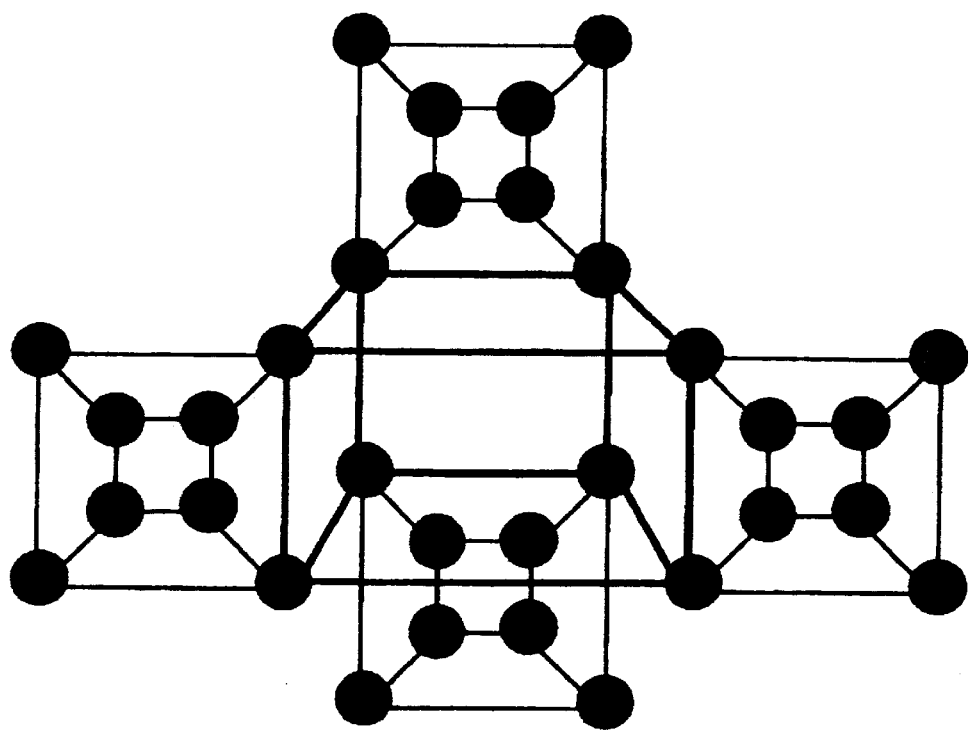

FIG. 10B illustrates four 3-dimensional hypercubes interconnected in the manner described above for FIG. 10A (for clarity, protections links are not shown). Note that by interconnecting the four hypercubes in this manner, a fifth interconnecting hypercube is advantageously formed therebetween. Each vertex node involved in the interconnection forms a portion of the interconnecting hypercube, and thus has two vertex node labels. Thus by increasing the number of hypercubes interconnected in this manner from two to four, an interconnecting hypercube is advantageously formed.

Many hypercube interconnections that do not form interconnecting hypercubes can usually be upgraded to do so by installing additional links (e.g., FIG. 10A). Typically, no existing links need to be removed or reconfigured. This capability is particularly advantageous in light of the increasing popularity of many network services, such as, for example, cable TV and computer information services. Should a network therefore experience growth in a region located between hypercubes, the interconnections thereof may be advantageously converted into hypercubes, thus permitting a network to increase capacity with little disruption to existing portions of the network. The adaptability of hypercube interconnections to changing network conditions is another advantage of hypercube networks.

Figure 11:
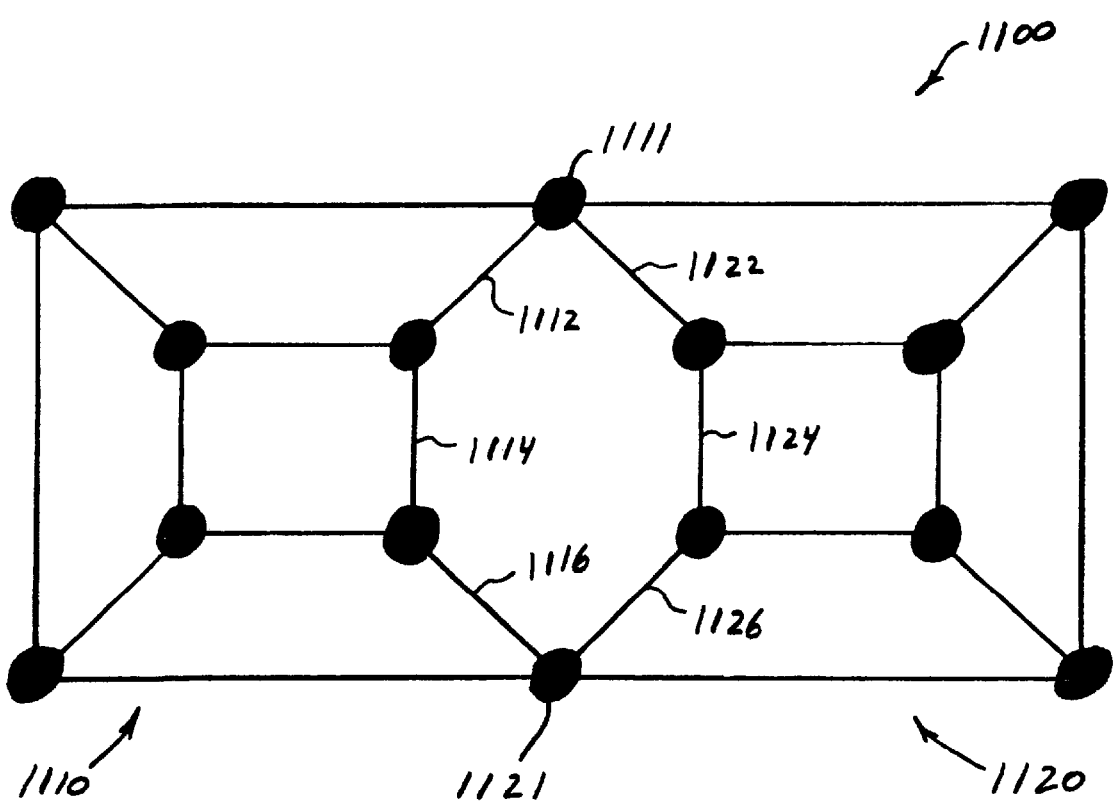
FIG. 11 is another alternatively interconnected portion of a 3-dimensional hypercube network according to the present invention.
Figure 1:
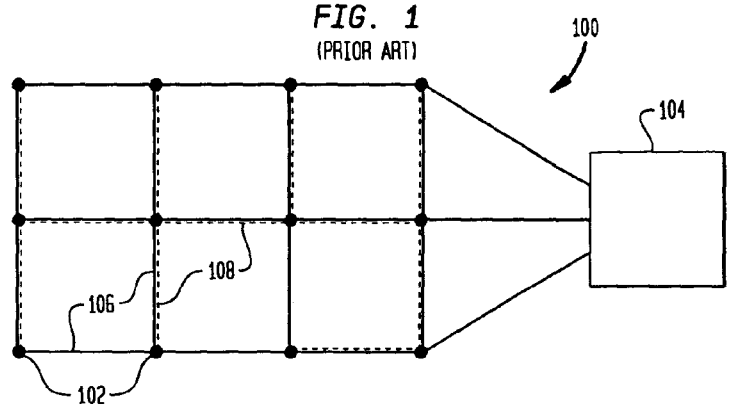
Figure 2A:
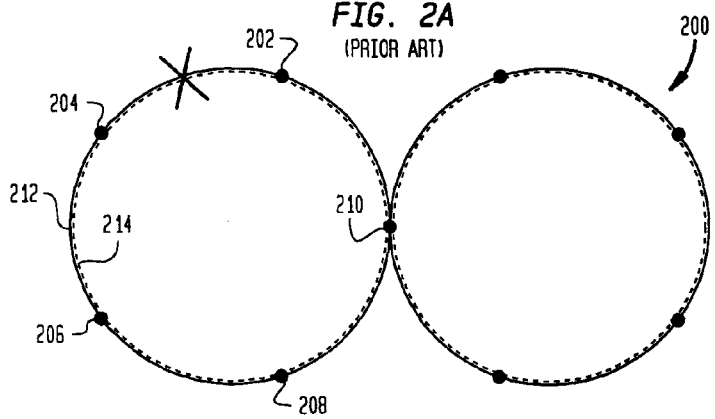
Figure 2B:
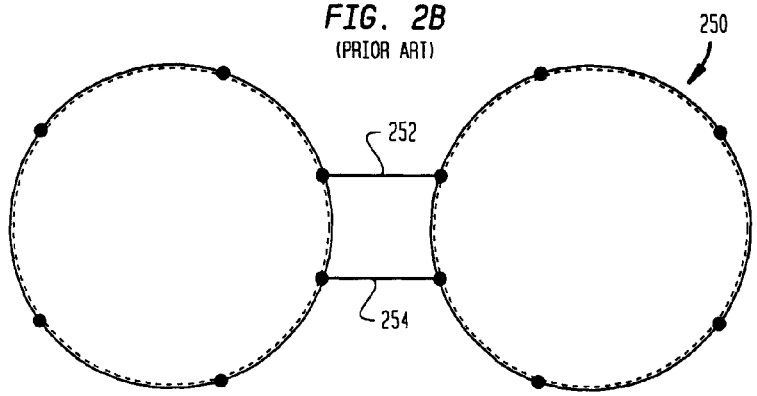
Figure 3A:
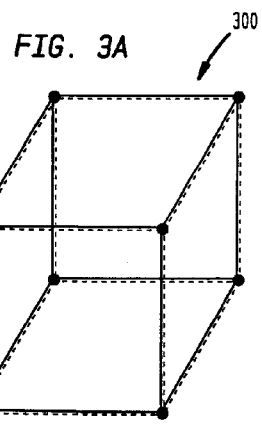
Figure 3B:
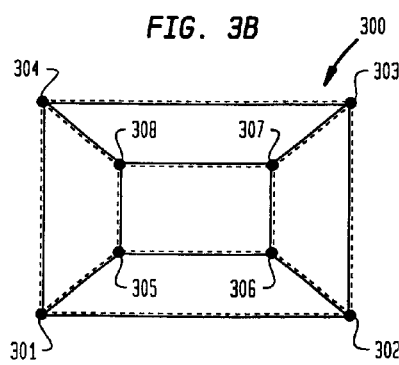
Figure 4:
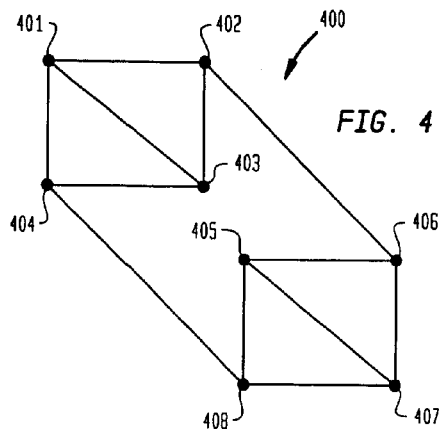
Figure 5:
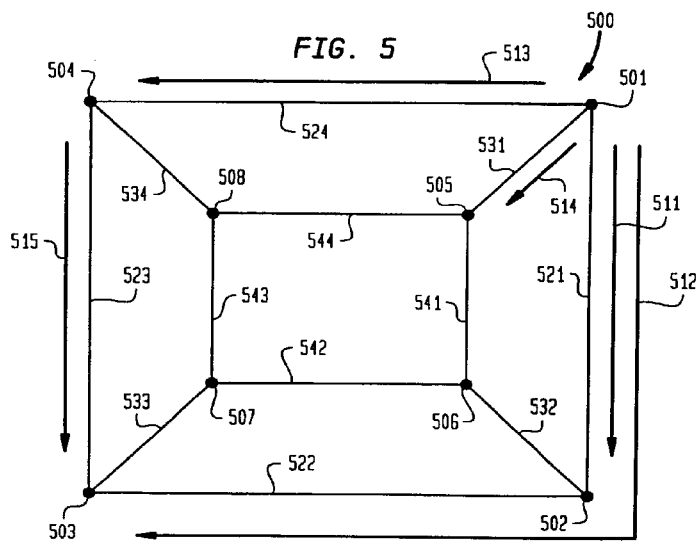
Figure 6:
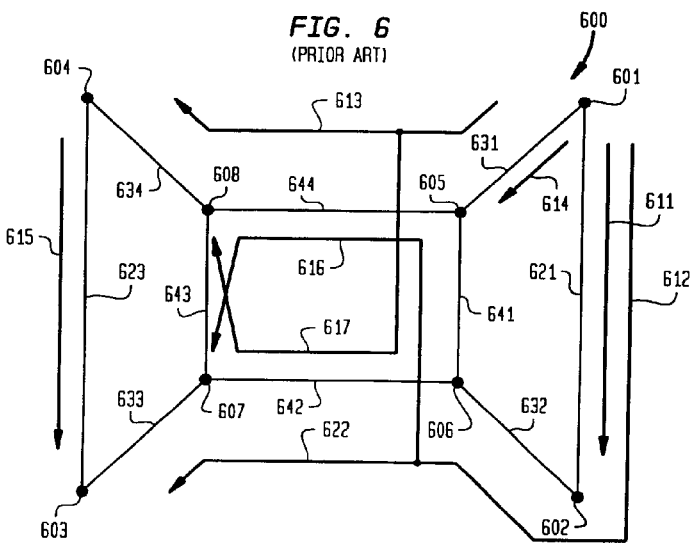

In some situations, it may be advantageous to share links between interconnected hypercubes. For example, the close proximity of existing nodes or links may make the building of additional nodes or installation of additional links unfeasible. An alternative interconnection for these situations is shown in FIG. 11 for a 3-dimensional hypercube network (again for clarity, protection links are not shown). Nodes 1111 and 1121 each form a part of hypercubes 1110 and 1120. Links 1112, 1114, and 1116 of hypercube 1110, while providing traffic transport to hypercube 1110, also provide traffic transport to hypercube 1120 (i.e., they form an equivalent twelfth link in hypercube 1120). Similarly, links 1122, 1124, and 1126 of hypercube 1120, while providing traffic transport to hypercube 1120, also provide traffic transport to hypercube 1110 (i.e., they form its equivalent twelfth link). A disadvantage, however, of such an interconnection is the increased interaction among hypercubes. A path failure in one hypercube, for example, is likely to affect traffic flow in the other hypercube. Thus, the independence of each individual hypercube is somewhat compromised.

Theoretically, each hypercube can be connected to an infinite number of other hypercubes. While practical considerations currently suggest that four hypercubes sharing the same interconnection is a manageable number, that number is likely to increase as technology advances. In any event, the independence of each hypercube advantageously permits routing and recovery algorithms to be substantially unaffected by such limitations, provided that each vertex node is assigned a unique node label for each hypercube in which the node forms a part.

Individual hypercubes within a network may advantageously be of different dimensions. For example, a network may be made up of a number of 3-dimensional hypercubes, 4-dimensional hypercubes, and 5-dimensional hypercubes. Interconnections of such differently dimensioned hypercubes can be made in any manner described above. Preferably, interconnections are advantageously made such that an interconnecting hypercube (of any dimension) is formed between the hypercubes to be interconnected. The flexibility of interconnecting differently dimensioned hypercubes advantageously permits a network operator to customize a network to meet a wide variety of network requirements.

Furthermore, the principles of the present invention can be applied advantageously to convert existing DRI ring networks. For example, by adding working and protection links between nodes 601 and 604 and nodes 602 and 603 of FIG. 6, and then eliminating redundant traffic transport between the rings, a two-ring portion of a DRI ring network can be converted into a 3-dimensional hypercube. Additional two-ring portions can than be interconnected as described above to form a complete network.

Thus it is seen that a network architecture for configuring a telecommunications network into a plurality of interconnected n-dimensional hypercubes is presented. One skilled in the art will appreciate that the present invention can be practiced by other than the described embodiments, which are presented for purposes of illustration and not of limitation, and the present invention is limited only by the claims which follow.

What is claimed is:

1. A method of routing traffic in a telecommunications network, said network comprising a plurality of working and protection links and a plurality of nodes, said links and said nodes being configured to form a plurality of interconnected n-dimensional hypercubes, each said node forming a part of at least one hypercube and being assigned a unique identifying label within each hypercube in which it is a part, each said label having a number of bit positions, and labels of interconnected adjacent vertex nodes within the same hypercube differing from each other by one bit in one bit position, said method comprising the steps of:

identifying a destination node and assigned destination node label;

routing said traffic to a successor node in accordance with a difference between the current node label, the predecessor node label, and the destination node label;

wherein said step of routing said traffic comprises the steps of:

determining which bit of which bit position of said current node label is different from said predecessor node label;

excluding that bit position from further analysis;

comparing the bits of the remaining bit positions of said current node label with the bits in the same bit positions of said destination node label;

adopting the bit value of the bit position having a different value than the same bit position of said current node label to determine a successor node label;

incorporating the remaining bits from the bit positions of said current node label to complete said successor node label; and routing said traffic to said successor node having a label the same as said successor node label.

2. The method of claim 1 further comprising the initial step of:

encoding said traffic with a node label.

3. The method of claim 1 further comprising the initial step of:

encoding traffic with a destination node label substantially at the time said traffic enters one of said hypercubes.

4. The method of claim 1 wherein n=3.

5. The method of claim 1, wherein the interconnection of at least one subplurality of n-dimensional hypercubes involves at least two said vertex nodes from each one of said subplurality of hypercubes.

6. The method of claim 1, wherein at least one of said hypercubes in said network has a different dimension n than at least one other of said hypercubes in said network.

7. The method of claim 1, wherein n $\geq$ 3.

8. The method of claim 1, wherein said working links and said protection links support bidirectional traffic flow.

9. The method of claim 1, wherein n=3 and each said protection link within one of said hypercubes has a traffic-bearing capacity of approximately 50% of the traffic-bearing capacity of the working link with the largest traffic bearing-capacity within that same hypercube.

10. The method of claim 1, wherein a path failure results in traffic being apportioned and routed through available protection links from the nodes coupled to said path failure.

11. The method of claim 10, wherein alternative paths formed with said available protection links are node disjoint.

12. The method of claim 1, wherein said links support bidirectional traffic flow.

13. The method of claim 1, wherein at least one of said hypercubes has at least one node of a degree less than n coupled between two said vertex nodes.

14. The method of claim 13, wherein n=3 and said degree less than n is degree 2.

15. The method of claim 13, wherein said at least one node of a degree less than n is associated with one of said two vertex nodes.

16. The method of claim 15, wherein upon a path failure between said at least one node of a degree less than n and said associated vertex node, said at least one node of a degree less than n becomes associated with said other of said two vertex nodes.

* * * * *

UNITED STATES PATENT AND TRADEMARK OFFICE
CERTIFICATE OF CORRECTION

PATENT NO.  : 6,456,588 B1
DATED       : September 24, 2002
INVENTOR(S) : Jane Marie Simmons It is certified that error appears in the above-identified patent and that said Letters Patent is hereby corrected as shown below:

<u>Drawings,</u>
Delete sheets 1 through 11 and substitute the attached sheets 1 through 7.

Signed and Sealed this

Nineteenth Day of August, 2003

JAMES E. ROGAN
*Director of the United States Patent and Trademark Office*